Oct. 31, 1961 L. E. HOAG 3,006,590
CORRUGATED PALLET
Filed Sept. 21, 1959 2 Sheets-Sheet 2
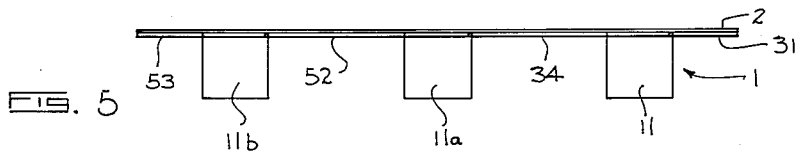
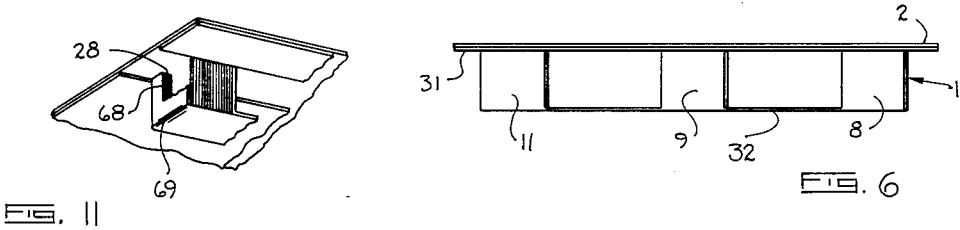
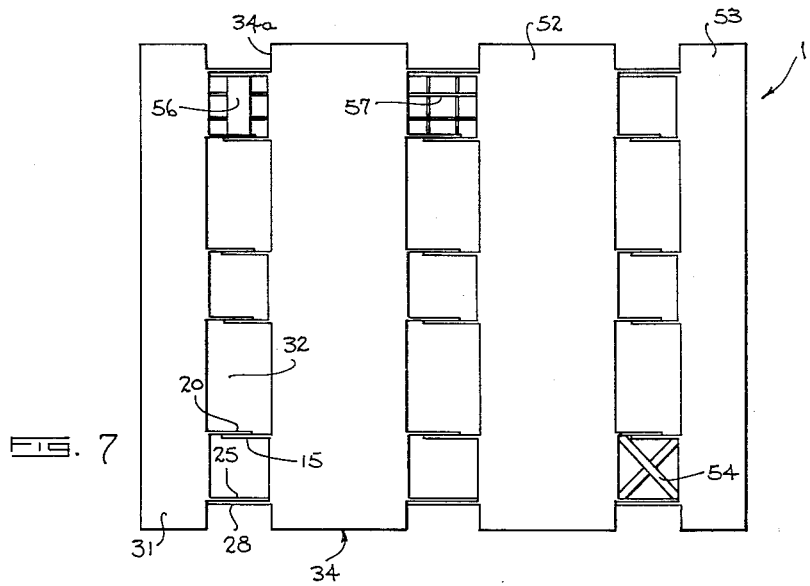
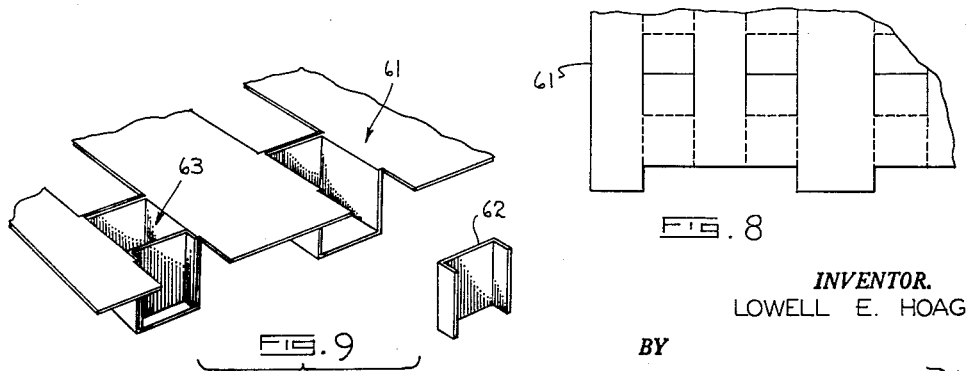
*INVENTOR.*
LOWELL E. HOAG
BY
Woodhams Blanchard & Flynn
ATTORNEYS United States Patent Office 3,006,590
Patented Oct. 31, 1961

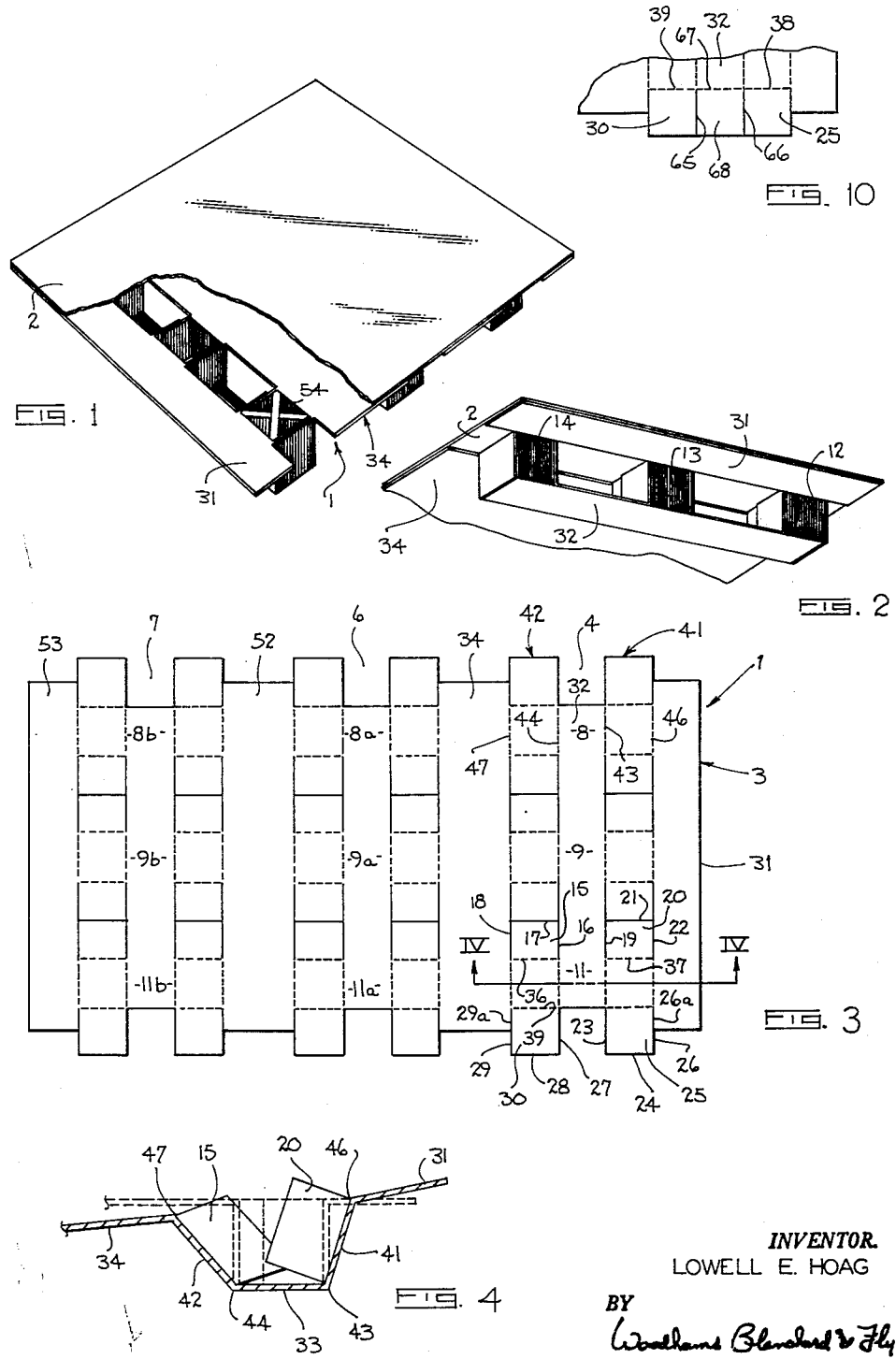

3,006,590
CORRUGATED PALLET
Lowell E. Hoag, 223 W. South St., Athens, Mich.
Filed Sept. 21, 1959, Ser. No. 841,329
7 Claims. (Cl. 248—120)

This invention relates to a pallet construction and more particularly relates to a pallet especially adapted for manufacture by mass production techniques from relatively inexpensive material, such as corrugated paperboard.

In many manufacturing operations, the use of various types of pallets has been standard practice for a great many years. Particularly, in the shipping of manufactured products it is common to ship said products in convenient containers, such as boxes, which are stacked on a shipping pallet so that they can be handled by standard lift trucks.

However, unless the pallets are made from relatively inexpensive materials, it is necessary that a manufacturer charge his customers for them or that the pallets be returned. Thus, the pallets are an element of expense introduced into the cost of the product as supplied to the consumer which add no increment of value to the product. Further, it is an inconvenience both to the manufacturer and to his customer to handle or account for the pallets to see that they are paid for or returned. Accordingly, if a pallet can be provided which is strong enough to be satisfactory at least for a single use thereof and which can be made sufficiently inexpensively that it can be destroyed after a single use, the above mentioned undesirable expense and inconvenience both to the manufacturer and to his customer will be eliminated.

This problem is by no means a new problem and I am fully aware that many attempts have been made to solve it and that many pallets have been offered for this purpose. However, the pallets previously offered, insofar as I am aware, have had one or more disadvantages which restricted the applicability of such pallets for the purposes above mentioned. Particularly, they have often been too expensive or, where they have been made sufficiently inexpensive to be economically acceptable, then they have been too weak.

Accordingly, the objects of the invention include the following:

(1) To provide a pallet, particularly useful as a shipping pallet, which can be manufactured at extremely low cost.

(2) To provide a pallet, as aforesaid, which is readily adaptable to mass production techniques.

(3) To provide a pallet, as aforesaid, which can be initially fabricated and shipped as flat sheets for final assembly by the user's personnel and thereby effect substantial savings in the pallet manufacturer's shipping costs.

(4) To provide a pallet, as aforesaid, which can be assembled quickly, easily and inexpensively.

(5) To provide a pallet, as aforesaid, which has sufficient strength for a single use thereof for shipping purposes and which is fully reliable for this purpose.

(6) To provide a pallet, as aforesaid, which can be readily modified to enable it to carry appreciably greater weights than it would otherwise be capable of carrying, which modification can be carried out inexpensively where needed but which can be omitted when it is not needed, with consequent savings in cost.

Other objects and purposes of the invention will be apparent to persons acquainted with devices of this general type upon reading the following disclosure and examining the accompanying drawings.

In the drawings:

FIGURE 1 is an oblique, partially broken, view of a pallet embodying the invention taken from the upper side thereof.

FIGURE 2 is a fragmentary, oblique view of said pallet taken from the lower side thereof.

FIGURE 3 is a top plan view of a sheet suitably cut and having fold lines provided therein so that it may be fabricated to form a base structure of the pallet embodying the invention.

FIGURE 4 is a sectional view taken along line IV—IV of FIGURE 3 and showing in solid lines one stage, and showing in broken lines another stage, in the folding process.

FIGURE 5 is a side view of a finished pallet.

FIGURE 6 is an end view of a finished pallet.

FIGURE 7 is a top view of the assembled base structure with the top sheet of the pallet removed.

FIGURE 8 is a fragmentary illustration corresponding to that of FIGURE 3 showing a modification.

FIGURE 9 is a fragmentary, oblique view showing the modification of FIGURE 8 and illustrating one portion thereof in exploded condition and another portion thereof in assembled condition.

FIGURE 10 is a fragmentary illustration corresponding to that of FIGURE 3 showing another modification.

FIGURE 11 is a fragmentary view, partially broken, corresponding to FIGURE 2 showing the modification of FIGURE 10 in assembled condition.

*General description*

In general the pallet of the invention comprises a base structure and a cover or top member. The base structure is formed of a single sheet of foldable material, such as corrugated paperboard. The sheet is formed into a plurality of parallel, integral channels having coplanar, integral flanges at the upper edges thereof. Flaps are cut into the sides of the channels, which flaps are folded to overlap each other to thereby define a plurality of aligned legs integral with and supporting the coplanar flanges. The cover member is then affixed rigidly to the coplanar flanges of the base. This functions both to hold the flanges in a fixed position with respect to each other and to hold the cover member in position for support on and by the legs.

*Detailed description*

Referring now to the invention in more detail, the embodiment of the invention herein selected for primary consideration consists of a base structure 1 supporting a cover member 2.

Referring first to the base structure 1, this is best disclosed by describing the manner and sequence of fabrication of same. In FIGURE 3 there is shown a sheet 3 properly cut, as by punching, and having appropriate fold lines therein for forming a suitable base structure 1. The solid lines in FIGURE 3 represent cut lines and the broken lines represent fold lines. The cut and fold lines in sheet 3 are arranged to define three zones designated generally by the numerals 4, 6 and 7, each of which when folded provides a row of supporting legs. Each of said zones in this embodiment is divided into substantially identical leg areas indicated generally at 8, 9 and 11 which when folded form individual leg structures indicated in FIGURE 2 at 12, 13 and 14, respectively. The other zones 6 and 7 are similarly divided into leg areas indicated at 8a, 8b, 9a, 9b, 11a and 11b, respectively, all substantially identical to the areas 8, 9 and 11. Since the leg areas are identical, a detailed description of the area 11 will suffice to provide a clear understanding of the structure and mode of assembly of all other leg areas above mentioned.

Referring now to the area 11, there is provided cut lines 16, 17 and 18 on one corner thereof, cut lines 19, 21 and 22 on another corner thereof, peripheral edges 23, 24 and 26 (this latter including a cut line 26a) on another corner thereof and edges 27, 28 and 29 (this latter including a partial cut line 29a) on the fourth corner thereof. The edge 26 and cut lines 26a and 22 and the corresponding cut lines in the areas 8 and 9, respectively, are all aligned and define one edge 46 of an unbroken strip 31 which functions, as will appear later, as a top receiving element. The edge 23 and the cut line 19 together with similar edges and cut lines of areas 8 and 9 are aligned with each other, as are the edge 27 and the cut line 16 together with the corresponding portions of areas 8 and 9, to provide an unbroken strip 32 having edges 43 and 44. The strip 32 acts, after the legs are formed, as a base connected to the legs in zone 4. The edge 29, cut lines 29a and 18 and corresponding edges and cut lines in areas 8 and 9 together with the parts defining the adjacent edge of zone 6 provide an unbroken strip 34 which upon assembly of the parts is coplanar with the strip 31 and further functions to hold the upper sheet or cover piece 2 as will be seen further hereinafter. The strip 34 has an edge 47 which defines the fourth edge in zone 4.

In folding the parts to form the leg structures, the flap 15 defined by the cut lines 16, 17 and 18 is bent upwardly along the line 36, the flap 20 defined by the cut lines 19, 21 and 22 is bent upwardly along the line 37, the flap 25 defined by the edges 23, 24, 26 and 26a is bent upwardly along the line 38 and the flap 30 defined by the edges 27, 28, 29 and 29a is bent upwardly along the line 39. The corresponding portions of areas 8 and 9 are similarly bent upwardly.

The entire strip 41 is then bent upwardly along the edge 43 and the entire strip 42 is bent upwardly along the edge 44. This brings the bent up flaps 15 and 20 and flaps 25 and 30, respectively, as well as the corresponding flaps in areas 8 and 9 into overlapping relationship to each other as illustrated in FIGURE 4. The strip 31 is then bent downwardly along the line 46 with respect to the strip 41 and the strip 34 is bent downwardly along the line 47 with respect to the strip 42. This bending is shown in a partially completed condition in FIGURE 4 in solid lines and is shown in its completed condition in broken lines.

When similar bending, folding and overlapping operations have been performed for the remaining rows 6 and 7 and the overlapping flaps have been secured together, as by gluing or stapling, the parts will be in the position shown in FIGURES 5, 6 and 7, FIGURE 7 best showing the overlapped relationship of the flaps for each leg.

Thus, there will be formed a base and leg structure wherein the strips 31, 34, 52 and 53 are all coplanar to form the upper part of the base structure as best shown in FIGURES 1, 2 and 5. The portions corresponding to the areas 8, 9 and 11 and their counterparts in rows 6 and 7, will form a plurality of spaced legs and in this embodiment said legs are arranged in three rows of three legs each, the same being aligned in both perpendicular directions in order to permit the entry of the fork of a lift truck from any of the four sides of the pallet. The side appearance of the legs is shown in FIGURES 5 and 6 wherein the visible legs are designated by numbers corresponding to the areas of FIGURE 3 from which said legs are formed.

If desired where the pallet is to support a substantial weight, each of the leg structures may be reinforced by the insertion thereinto of a suitable reinforcement element, such as the X-shaped insert 54 shown in FIGURES 1 and 7. Other possible forms of reinforcing means include various forms of honeycomb structures such as those illustrated at 56 and 57 in FIGURE 7.

With the base structure 1 formed in the manner above described, the top sheet 2 is laid over and in contact with strips 31, 34, 52 and 53 and is secured thereto in any convenient manner, such as by adhesive or by stapling.

It will be observed that the ends of the several strips 31, 34, 52 and 53, such as the end 34a indicated in FIGURE 7, extend outwardly somewhat beyond the adjacent legs. This is desirable to secure a better weight distribution of the load on each of the legs.

It will also be noticed, as best shown in FIGURE 3, that the ends of the outermost flaps in each row, such as flaps 25 and 30, extend somewhat beyond the ends of the areas 31, 34, 52 and 53 and that, accordingly, a somewhat wider sheet of material will be required for making the base structure here shown than would be required if extensions were not used. Where the materials from which said base is made are relatively expensive, this may add substantial expense to the total operation. In such cases, if desired, the flaps 25 and 30 may be omitted, as shown in FIGURE 8 and the leg formed as indicated generally at 61 in FIGURE 9. A separate end piece 62 is then formed as shown and inserted in the manner shown generally at 63. The end piece 62 may be formed of scrap or any suitable material, as desired.

Another modification of the invention is shown in FIGURES 10 and 11. Here the strip 32 is made of the same length as strips 41 and 42. Cut lines 65 and 66 are provided between strip 32 and the other strips 41 and 42. A fold line 67 is provided in strip 32 and said fold line and cut lines 65 and 66 define a flap 68. After flaps 25 and 30 are folded upwardly and overlapped as previously described, the flap 68 is then folded upwardly to overlap said flaps 25 and 30 and is secured thereto so that the leg has three thicknesses of material. This is advantageous not only because it increases the strength of the leg but also because it provides a rounded corner or shoe 69 at the end of strip 32 which will minimize the possibility of tearing or separating said strip from the remainder of the sheet in use.

While the material from which the pallet of the invention is made may be anything convenient or effective for the purpose, said pallet has been primarily designed with corrugated paperboard in mind and such material is particularly effective and inexpensive. When such material is used, or any other material having greater strength in one perpendicular direction than in the other, care should be taken that the alignment of the elements of greater strength should be lengthwise of the sheet as shown in FIGUE 3. Thus elements of greater strength will be aligned in the flaps 15, 20, 25 and 30 in such a direction they will be vertical upon the folding and assembly of the sheet and therefore, be in a position to provide maximum strength to the leg structure.

While the base 1 and top 2 will normally be made of the same material, it is entirely possible for said parts to be made of different material, such as the base 1 being made from corrugated paperboard and top 2 being made from other available material, such as plywood or sheet metal. Various sheet plastics may also be used for the top sheet 2 where their special properties justify the cost. Moreover, the top may be formed with upstanding walls to provide a tray rather than being flush as shown in the drawings.

It will be seen that only a single punching operation is required to prepare the base sheet so that it can be formed into the desired product. The cover can be formed in any suitable manner. Thus, the pallet here disclosed is well adapted for mass production techniques and it is particularly well adapted to fabrication by automatic machinery. The pallet structure may be shipped in flat form for maximum economy to the point of use and same can be formed quickly and easily into required shape by the customer's workmen with a minimum of time and expense.

Thus, this type of construction is well adapted to manufacture at a minimum of cost in that it can be made from relatively inexpensive materials and fabricated by inexpensive techniques. However, the pallet will be strong and sturdy and, if desired, it can readily be inexpensively reinforced for even greater strength as needed. It is therefore highly versatile and well adapted to meet a variety of different use requirements.

Although particular, preferred embodiments of the invention have been disclosed hereinabove for illustrative purposes, it will be understood that variations or modifications thereof, which lie within the scope of the invention are fully contemplated unless specifically stated to the contrary in the appended claims.

What is claimed is:

1. In a two-part pallet designed for manufacture from corrugated paperboard, the combination comprising: a base structure comprising a base sheet defining a plurality of parallel flanged channels spaced from each other and whose flanges are coplanar and integral with each other, said channels having partially detached areas in the parallel sides of each thereof which areas are bent toward and overlap each other so that each channel provides a plurality of spaced, generally rectangular legs; means for securing said overlapped areas for each leg firmly together; a cover member lying closely against said coplanar flanges and means firmly fastening said cover to said flanges for simultaneously holding said flanges rigidly against movement with respect to each other and for holding said cover member in supported relationship by said legs.

2. In a pallet construction, a one-piece base sheet having coplanar strip portions and a plurality of channel-shaped sections depending therefrom between the strip portions, each channel-shaped section including a plurality of areas in which the base wall of said channel-shaped section is hingedly joined with a zone on each of the side walls of said channel-shaped section and in which each of said side walls is cut to form two flaps which are hingedly joined to opposite side edges of said zone, corresponding flaps on said side walls of each area being bent toward each other into overlapping relationship and secured together so that each area defines a leg depending from said strip portions, whereby each channel-shaped section defines a plurality of legs spaced apart along said section.

3. In a pallet construction, a one-piece base sheet having a plurality of offset, substantially channel-shaped sections which are spaced from each other and whose upper ends are connected by coplanar strips integral therewith, the side walls of each channel-shaped section being cut to form a plurality of flaps which are each hingedly connected along one edge thereof to the remainder of the side walls, each flap in a side wall having a corresponding flap in the other side wall and said corresponding flaps being bent into overlapping relationship and secured to each other so that each channel-shaped section defines a plurality of spaced legs which is connected by the base wall of the channel-shaped section, the base wall being common to all of the legs.

4. The pallet construction as defined in claim 3 including a cover sheet rigidly affixed with respect to said coplanar strips.

5. A pallet construction as defined in claim 3 including also a cover sheet rigidly affixed to and lying against said coplanar strips.

6. In a pallet construction as defined in claim 2 including a cover member fixed with respect to said coplanar strip portions and spaced from said base wall whereby said plurality of legs are positioned between said cover and said base wall.

7. The pallet construction defined in claim 6 including a reinforcing insert positioned within at least some of said legs and held therein between said base wall and said cover.

References Cited in the file of this patent

UNITED STATES PATENTS

| | | |
|---|---|---|
| 1,585,683 | Oppenheim | May 25, 1926 |
| 2,493,562 | Yarman | Jan. 3, 1950 |
| 2,576,715 | Farrell | Nov. 27, 1951 |
| 2,696,356 | Baumann | Dec. 7, 1954 |
| 2,808,978 | Wright | Oct. 8, 1957 |

FOREIGN PATENTS

| | | |
|---|---|---|
| 779,014 | Great Britain | July 17, 1957 |